F. W. Sawyer.
Shuttle.

N°70,026. Patented Oct. 22, 1867.

Witnesses
Thos. H. Dodge
D. L. Miller

Inventor
F. W. Sawyer

United States Patent Office.

F. W. SAWYER, OF GRAFTON, MASSACHUSETTS.

Letters Patent No. 70,026, dated October 22, 1867.

IMPROVEMENT IN LOOM-SHUTTLE.

The Schedule referred to in these Letters Patent and making part of the same.

KNOW ALL MEN BY THESE PRESENTS:

That I, F. W. SAWYER, of Grafton, county of Worcester, and Commonwealth of Massachusetts, have made a certain new and useful Improvement in Shuttles; and I do hereby declare that the following is a full, clear, and exact description of the same, reference being had to the accompanying drawings, forming a part of this specification, and in which—

Figure 1:
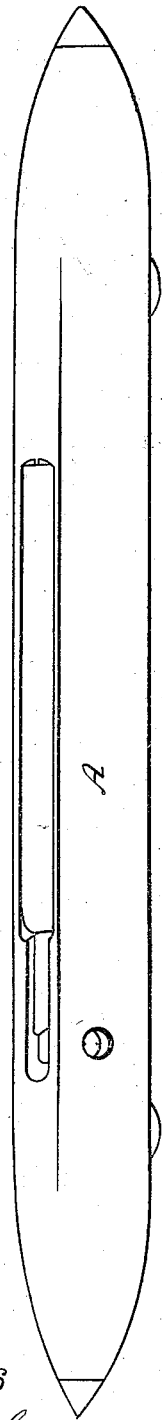
Figure 1 represents a perspective view of my improved shuttle.
Figure 2:
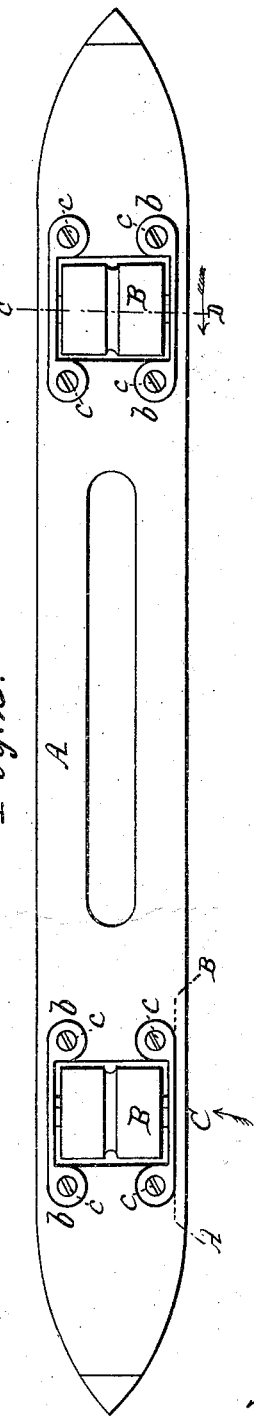
Figure 2 represents a bottom view.
Figure 4:
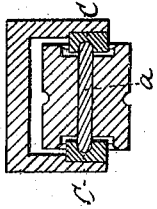
Figure 4 represents a section on line C D, fig. 2.
Figure 3:
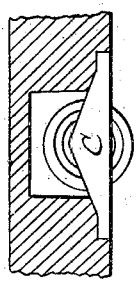
Figure 3 represents a section on line A B, fig. 2.

The shuttle A in its general shape and form does not differ from those in common use. My improvement relates to the mode of supporting the friction-rolls B B. Rolls B B turn on journals $a$, which are supported by bearings C C inserted in the bottom of the shuttle at each end, as fully indicated in the drawings. A side view of one of these bearings is shown in fig. 3, and cross-sections of the bearings which support one roll are shown in fig. 4. The bearing-pieces C have ears, $b\,b$, through which screws $c\,c$ are passed to hold them securely in place. As the bearing-pieces C are let in flush with the bottom of the shuttle they do not catch the threads, while at the same time they do not materially weaken the strength of any part of the shuttle, the sides of the shuttle being full as strong at the ends as at any other part of the shuttle.

Having described my improved shuttle, what I claim as my invention, and desire to secure by Letters Patent as an improved article of manufacture, is—

A shuttle having friction-rolls B B, the journals of which are supported in bearings inserted in slots or recesses cut or formed in the bottom of the shuttle, substantially as described.

F. W. SAWYER.

Witnesses:
 THOS. H. DODGE,
 D. L. MILLER.